United States Patent [19]

Saitoh et al.

[11] Patent Number: 4,599,658

[45] Date of Patent: Jul. 8, 1986

[54] THERMO-MAGNETIC RECORDING METHOD

[75] Inventors: Koichi Saitoh; Teruhiko Itami; Toshifumi Kimoto; Nobuo Nishimura, all of Kanagawa, Japan

[73] Assignee: Fuji Xerox Co., Ltd., Tokyo, Japan

[21] Appl. No.: 411,129

[22] Filed: Aug. 24, 1982

[30] Foreign Application Priority Data

Aug. 25, 1981 [JP] Japan ................................ 56-132893

[51] Int. Cl.[3] ................................................ G11B 5/02

[52] U.S. Cl. ...................................... 360/59; 346/74.2

[58] Field of Search .......................... 360/59, 113, 114; 346/74.2, 74.4

[56] References Cited

U.S. PATENT DOCUMENTS

| | | | |
|---|---|---|---|
| Re. 29,530 | 1/1978 | Krumme et al. | 360/59 |
| 3,453,646 | 7/1969 | Spelioris et al. | 360/59 |
| 3,693,183 | 9/1972 | Lemke | 360/59 |
| 3,824,601 | 7/1974 | Garland et al. | 346/74.4 |
| 3,935,578 | 1/1976 | Condon et al. | 360/59 |

*Primary Examiner*—Vincent P. Canney

*Attorney, Agent, or Firm*—Sughrue, Mion, Zinn, Macpeak, and Seas

[57] ABSTRACT

A method of thermo-magnetic recording employs a recording medium of a magnetization material disposed on an insulator. An area on the medium is joule-heated via the application of a voltage across contacting electrodes up to a bias point, and a heat pattern is applied in the form of an image to form a magnetic latent image.

10 Claims, 2 Drawing Figures

THERMO-MAGNETIC RECORDING METHOD

BACKGROUND OF THE INVENTION

This invention relates to a magnetic recording method, and more particularly to a thermo-magnetic recording method in which a thermal pattern in the form of an image is input to form a magnetic latent image.

In magnetic recording methods, a magnetic latent image is formed in a magnetic material by magnetization and is then made visible by the use of magnetic toner particles, namely, magnetization detection type coloring particles which include magnetic particles in a macromolecular resin for instance which are affected by a magnetic field. The visible image thus obtained is transferred onto a sheet or the like by an electrostatic or magnetic method, and is then fixed by heat or pressure.

The same process is again carried out when a magnetic latent image carrier, namely, the magnetic recording medium, after being subjected to magnetic toner removal, is advanced to the next developing cycle as it is, or when, with the magnetic latent image erased, a new latent image is formed.

In the above-described magnetic recording method, the magnetic latent image is, in general, formed by magnetization with a recording current being allowed to flow in the magnetic head adjacent to the magnetic recording medium according to the image signals.

In the case where such a magnetic head is used to form a magnetic latent image over the entire width of the magnetic recording head, in general, single or plural printing sections for magnetization, i.e., magnetic recording tracks with recording gaps are provided, and a magnetic recording operation is carried out by the combination of a recording operation (main scanning) in the direction of movement of the magnetic recording medium and a transverse scanning operation (auxiliary scanning) performed perpendicularly to the aforementioned direction.

According to this method, an accurate drive and control method for maintaining the auxiliary scanning intervals constant is required, or it is necessary to move the magnetic recording medium at a high speed to reduce the scanning time, or to move the magnetic recording medium at low speed to form an image through development and transfer. That is, a precise and expensive drive and control method including various operational modes is required.

For such a scanning magnetic head recording operation, a method has been proposed in which a so-called multi-magnetic-head array, in which magnetic recording tracks are provided over the entire image width with high density so as to meet the necessary resolution of the reproduced image, is used to record the image one picture element line at a time as the magnetic recording medium is moved.

With this multi-magnetic-head array, in order to attain sufficient resolution of the reproduced image, it is necessary to provide thin tracks (less than about 100 $\mu$m in width) at intervals of about 100 $\mu$m.

Furthermore, in order to reduce the recording current, it is necessary to provide coils of plural turns for these tracks; that is, small and intricate parts are necessary. In addition, because of the electromagnetic interference between adjacent tracks, the realization of such a multi-magnetic-head array is considerably difficult.

The prior art utilizing magnetic heads is as described above. A so-called "thermo-magnetic" recording method utilizing heat applying means to form an image has also been proposed.

In the thermo-magnetic recording method, a so-called "thermo-magnetic recording medium" whose magnetic characteristics are modulated by temperature is used, and the thermo-magnetic recording medium, which has been magnetized, is particularly heated to a temperature higher than the Curie temperature by selectively applying heat, so that the latter is demagnetized. Alternatively, an external magnetic field is applied to a magnetization thermo-magnetic recording medium simultaneously as heat is applied to the latter, to thereby selectively magnetize the heated portion.

Examples of the heat applying means used in the thermo-magnetic recording method are laser beams, a flash beam, and a thermal head array in which finely separated heat generating resistance elements are arranged in one or plural lines.

The above-described methods are disadvantageous in that, as high thermal energy is partially applied to the thermo-magnetic recording medium, the latter may be deformed, and, when using the laser beam, considerably high power is required.

SUMMARY OF THE INVENTION

Accordingly, an object of this invention is to provide a thermo-magnetic recording method in which the above-described difficulties have been eliminated, and the deformation of the thermo-magnetic recording medium due to the application of heat is prevented.

More specifically, an object of the invention is to provide an improved bias heating method in which thermal losses due to contact are not caused, and wherein bias heating temperature differences due to contact differences are likewise not caused.

The foregoing object of the invention has been achieved by provision of a thermo-magnetic recording method in which, according to the invention, the magnetic recording medium has a ferromagnetic surface layer which is thermally magnetizable and disposed on an insulating layer, and in which a pair of electrodes are brought into contact the ferromagnetic surface layer. A voltage is applied to the electrodes to preheat the ferromagnetic surface layers, and simultaneously with or immediately after preheating is carried out, a heat pattern in the form of an image is inputted and a uniform magnetic field is applied to form a magnetic latent image in the ferromagnetic surface layer.

BRIEF DESCRIPTION OF THE DRAWINGS

This invention will now be described with reference to the accompanying drawings; in which.

DETAILED DESCRIPTION OF THE PREFERRED EMBODIMENTS

Figure 1:
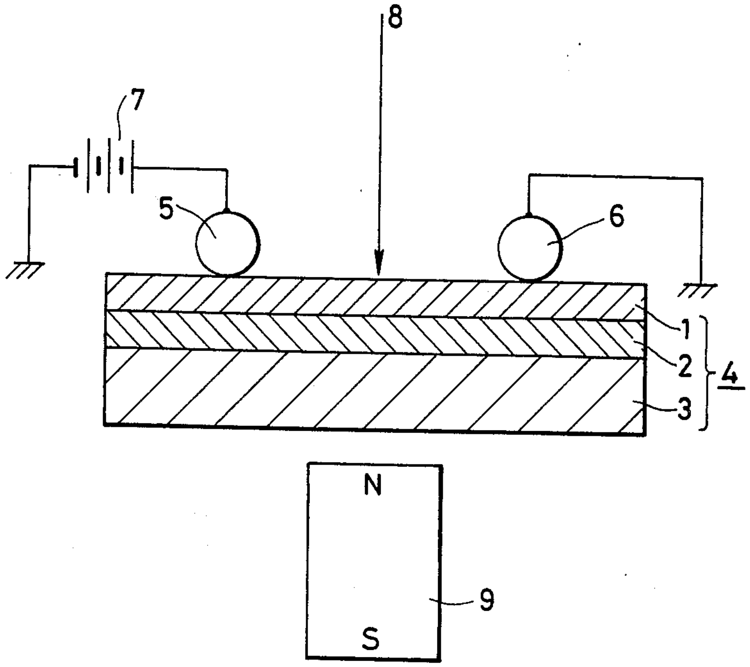
FIG. 1 is an explanatory diagram showing one example of a thermo-magnetic recording method according to the invention.

FIG. 1 shows a first example of a magnetic recording medium employed in the thermal magnetic recording method according to the invention.

The magnetic recording medium 4 is made up of a ferromagnetic layer 1, an insulating intermediate layer 2 and a base layer 3. Electrode rolls 5 and 6 for applying a voltage are provided in such a manner that they are in contact with the ferromagnetic layer 1. A voltage is applied to the electrode rolls 5 and 6 by an electric power source 7. In FIG. 1, reference numeral 8 designates the incident radiation direction; and 9, a magnetic field generating permanent magnet which is used to magnetize the ferromagnetic substance.

In operation, a current is allowed to flow in the ferromagnetic layer 1 due to the voltage applied between the electrode rolls 5 and 6. The ferromagnetic layer 1 is subjected to Joule heating by this current. When radiated rays 8 in the form of an image are applied to the heated region (thermal pattern input), it absorbs the rays to increase the temperature thereof. That portion of the ferromagnetic layer 1 which is maintained at high temperature by the absorption of the rays is selectively and thermo-magnetically magnetized by the magnetic field formed by the permanent magnet 9, as a result of which a magnetic latent image is formed.

The preheating by Joule heating is performed at a temperature which does not thermally magnetize the ferromagnetic layer 1. Preferably, the ferromagnetic layer 1 must be heated to a temperature of about 30° C. less than Curie temperature thereof.

The formation of the thermal pattern on the ferromagnetic layer 1 by the absorption of the incident radiation is performed at a temperature higher than the temperature at which the preheated ferromagnetic layer 1 can be thermally magnetized. That is, it is heated to a temperature more than around the Curie temperature thereof. For example, in case where a $CrO_2$ dispersion layer (Curie temperature is about 130° C.) is employed as a ferromagnetic layer 1, after the ferromagnetic layer 1 is preheated uniformly to about 100° C., this preheated region is heated to a temperature more than about 130° C. by the application of the radiation ray in the form of an image. The formed thermal pattern thus on the ferromagnetic layer 1 is selectively magnetized by magnetic field effect. Subsequently, by cooling the ferromagnetic layer 1 down to a temperature less than Curie temperature, the magnetic latent image is formed on the ferromagnetic layer surface.

For example, as a radiation ray, a flash light or a laser is employed. The most preferable one is a laser. As such a laser, YAG laser applied with a mode period (Mode locked YAG laser), $CO_2$ laser, Ar lasser, He-Ne laser and a semiconductor laser are available. In the case of a laser heating, the radiation from the laser oscillator is irradiated and heated through a modulator and a scanning mirror directly to the ferromagnetic layer surface. In this case, video signals are inputted to the modulator.

In the above-described thermo-magnetic recording method, the temperature of the ferromagnetic layer is biased to a given value by Joule heating due to the passage of current therethrough. Therefore, the energy of the radiation applied can be reduced.

The pair of electrode rolls, i.e., the current heats only a predetermined region of the magnetic recording medium, i.e., only that portion where the thermal pattern is formed and magnetic field is applied. This method carries out bias heating more efficiently than methods such as one in which the entire magnetic recording medium is bias-heated or one in which rolls at high temperature are brought into contact with the magnetic recording medium.

Furthermore, owing to the current flowing in the thermo-magnetic recording medium, the thermo-magnetic recording medium is uniformly bias-heated, and the bias temperature is uniform.

The ferromagnetic layer may be of any type as long as it has a relatively low Curie temperature or compensation temperature and can perform Joule heating. That is, the ferromagnetic layer used must have a sufficient electrical resistance, which is defined by the distance between the electrode rolls, the width of the electrode rolls, the thickness of the ferromagnetic layer and the volume resistivity of the sme, so that Joule heat is produced in the ferromagnetic layer by the current from the power source, as a result of which the ferromagnetic layer is bias-heated to a predetermined temperature.

Particularly preferable are a ferromagneticc layer of $CrO_2$ (chromium dioxide) dispersed in binder resin and an amorphous layer of an alloy of a rare earth metal - a transition metal (for example, Tb-Fe, Gd-Fe). This material is then coated on the intermediate layer or the base layer to obtain the magnetic recording medium. In order for Joule heating to be carried out more efficiently, carbon black, metal particles (such as aluminum and copper), metal oxides (such as aluminum oxide, antimony oxide, zinc oxide, tin oxide and titanium oxide) and metal salts (such as CuI) or electrically conductive organic materials (trade name ECR made by the Eastman Kodak Co.) together with chromium dioxide particles may be so dispersed, in such a manner that the resistivity and/or the specific heat of the magnetic recording medium is suitably adjusted. The binder resin for the ferromagnetic layer is selected from thermally stable polymer such as polyamide, polyimide, polybenzimidazole and polyethersulfone.

The insulating intermediate layer 2 is for preventing the flow of the Joule heating current to parts other than the ferromagnetic layer; however, it should be noted that the layer 2 also serves as a heat insulation layer. The intermediate layer is preferably a glass layer or ceramic layer, or may be of thermally stable polymer such as polyamide, polyimide, polybenzimidazol and polyethersulfone.

In the case where the base layer 3 is an insulating layer, it is unnecessary to provide the intermediate insulating layer. In this case, the base layer also serves as the intermediate layer.

Figure 2:
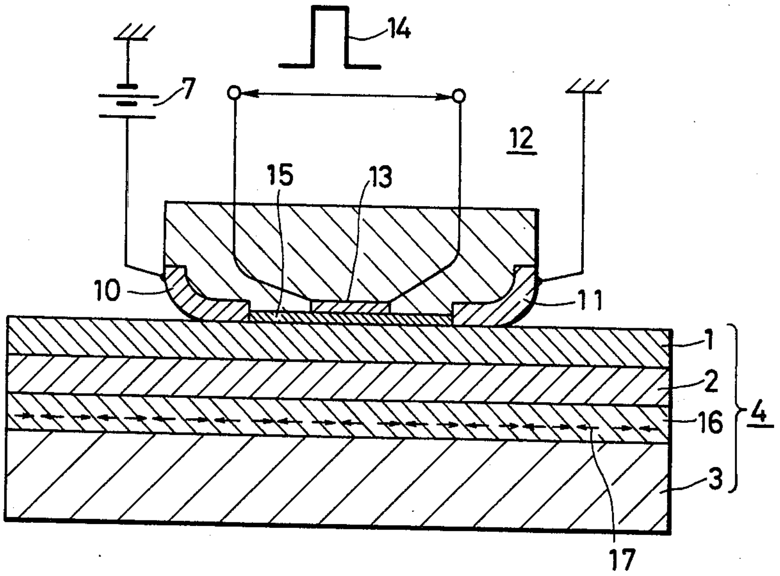
FIG. 2 is an explanatory diagram showing another example of a thermo-magnetic recording method of the invention.

FIG. 2 shows a second example of the method according to the invention.

FIG. 2 is intended to provide a bias heating method which can be suitably employed in a magnetic recording method and with the magnetic recording medium disclosed in Japanese Patent Application Nos. 106192/1980 and 37865/1981 filed by the applicant.

In FIG. 2, reference numeral 12 designates a heating head array, and resistance heating elements 13 are juxtaposed perpendicularly to the surface of the drawing and are supplied with signal voltages 14. Reference numeral 15 designates the surface protecting layer of the heating head array. Reference numerals 10 and 11 designate a pair of electrodes for applying current to the magnetic recording medium to subject the latter to Joule heating. The electrodes are electrically connected to the thermo-magnetic recording medium, so that current from a power source 7 is applied to the ferromagnetic layer. Reference numeral 16 designates a second ferromagnetic layer which is under uniform magnetization 17. The second ferromagnetic layer 16 serves to apply a magnetic field necessary for thermomagnetic recording through an insulating intermediate layer 2 to the first ferromagnetic layer 1.

The second ferromagnetic layer may be any type so long as Curie temperature of the latter is equal to or higher than that of the first ferromagnetic layer which is the thermomagnetic recording medium. The magnetization 17 may be produced by in-plane magnetization (as shown in FIG. 2) or perpendicular of an all surface uniform modulation magnetization pattern in magnetization and modulated in one direction or two directions.

Now, a method of obtaining a visible image from the magnetic latent image will be described.

The magnetic latent image is developed with a developing agent including magnetic toner, transferred onto a transferring material such as a sheet or plastic film, and then fixed, to obtain a copy of the image. In the case where a number of copies are to be obtained from one and the same magnetic latent image, after transferring, the magnetic recording medium is cleaned when required, and developing, transferring and fixing are repeated as many times as the number of copies required. After a desired number of copies are obtained, the magnetic recording medium is cleaned and demagnetized to erase the magnetic latent image, thus becoming ready for the next copying operation.

Magnetic toner powder including a magnetic powder in a binding resin may be directly employed as the developing agent, or a magnetic toner powder with a carrier may be employed. It is preferable that the magnetic toner powder include 30 to 80% magnetic powder by weight.

A cascade development method, a magnetic brush development method, a touch down developing method or a powder cloud developing method may be employed in developing. Among these methods, the magnetic brush development method is most preferable because the magnetic toner can be conveyed at high speed, and the magnetic toner sticking to the background portion of the magnetic recording medium can be removed by a magnetic brush, whereby the developing operation can be achieved at high speed and with high quality.

In the magnetic brush method, a non-magnetic sleeve and a magnet disposed inside of the sleeve are used, and development is effected when the magnetic brush of the developing agent including magnetic toner formed on the non-magnetic sleeve is brought into contact with or near the magnetic latent image.

In this case, the magnetic force of the magnet or the distance between the sleeve and the magnetic recording medium is determined so that the magnetic latent image is not destroy.

It is preferable that an electrostatic transfer method or a pressure transfer method be employed in the transferring operation.

The toner image on the transfer material is fixed by a heat fixing method or a pressure fixing method. It is desirable to employ a heat roll fixing method in which a pair of rolls, namely, a heating roll and a pressure roll are used.

Fixing simultaneous with pressure transfer may be carried out using magnetic toner which can be fixed under pressure.

The thermo-magnetic recording method of the invention will be further described with reference to the following examples.

EXAMPLE 1

A commercially available magnetic tape prepared by forming a $CrO_2$ dispersion layer of about 5 μm in thickness on a polyester film ("Mylar") of 20 μm in thickness was used to perform a thermo-magnetic recording operation according to the method described with reference to FIG. 1. The "Mylar" layer served as both the base layer and the insulating intermediate layer. Stainless steel rolls were pressed against the $CrO_2$ layer of the magnetic recording medium (30 cm in width) in such a manner that the centers of the rolls were spaced from each other by 10 mm. A 30 mW linear polarization He-Ne laser was used as a radiation source. In order to simultaneously control the amount of radiation and the pulse time, an electro-optical crystal (KDP) was used to electro-optically carry out modulation of the value and the time of the applied voltage. The laser beam, after being passed through a beam expander, was focussed onto a spot 100 μm in diameter. The laser beam thus treated was applied to the chromium dioxide layer.

A bias magnetic field was applied to the "Mylar" base film of the chromium dioxide tape so that the magnetic field in the tape became 100 Öe.

The intensity of the laser beam was 12 mW in maximum power after an aperture lens, and was designed so as to be continuously reduced by an electro-optical modulator. The pulse time half value width was fixed at 5 m sec. After conducting a thermo-magnetic operation with the laser beam, a commercially available electrostatic recording single component magnetic toner ("TELECOPIC 210"manufactured by Fuji Xerox Co.) was sprayed onto the recording medium. The amount of adhesion was evaluated in terms of the reflection density. With the toner transferred onto a pressure sensitive adhesive tape, the input power necessary for toner image density of 1.0 was measured. At the same time, the magnetic tape surface was observed under a microscope, to obtain the following Table 1:

TABLE 1

| Voltage between electrode rolls (V) | Power necessary for recording density of 1.0 (mW) | Thermal deformation of tape |
|---|---|---|
| 0 | 12 | Yes |
| 200 | 10 | Yes |
| 400 | 7 | No |
| 600 | 5 | No |

It is apparent from the above Table that the invention has an excellent effect in that, while the necessary laser power is reduced, the thermal deformation of the magnetic layer is suppressed.

EXAMPLE 2

A commercially available metal tape sheet (30 cm in width and about 5 μm in thickness) prepared by dispersing fine Fe-Co particles in a macromolecular resin on a polyester ("Mylar") film of 20 μm in thickness was used. An AC current was applied to an elongated (30 cm in width) magnetic head, so that the sheet was magnetized substantially to saturation with modulation approximating a sine wave having a period of about 30 μm in the direction of the conveyance of the sheet.

On the other hand, a chromium dioxide sheet of about 5 μm in thickness prepared by dispersing chromium dioxide in a macromolecular resin on a "Mylar" film of about 12.5 μm in thickness was provided. The chromium dioxide sheet was laminated on the above-described magnetized metal tape sheet in such a manner that the base of the chromium dioxide was in contact with the metal tape side of the metal tape sheet.

On the other hand, as shown in FIG. 2, two electrodes were set in a manner such that the electrodes were disposed on both sides of a commercially available heating head array and the minimum distance between the electrodes wass 5 mm. The commercially available heating head used was one which is normally used in a facsimile for coloring a heat-sensitive coloring sheet, and the heating parameters therefor are the applied electric power and the power application time.

In the arrangement shown in FIG. 2, the power application time was set to 4 m sec. Under this condition, similarly as in Example 1, the necessary applied power density was obtained when the developing density reached 1.0 while the thermo-magnetic recording medium was moved. At the same time, the thermal deformation of the magnetic layer was investigated. The results are as indicated in the following Table 2:

TABLE 2

| Voltage between electrodes (V) | Necessary power density ($W/mm^2$) | Thermal deformation of tape |
|---|---|---|
| 0 | 15 | Yes |
| 100 | 10 | Yes, but slight |
| 200 | 8 | No |
| 300 | 6 | No |

As is apparent from the above description, according to the invention, in the thermo-magnetic recording method, the applied thermal energy is reduced, and the thermal deformation of the magnetic recording medium used can be prevented.

As the applied energy is decreased, the speed of thermo-magnetic recording operation can be increased.

In the method of this invention, unlike the bias heating method in which rolls or the like heated to high temperatures are brought into contact with the recording medium, only the necessary portion of the recording medium is directly heated. Accordingly, thermal losses due to the contact or differences in the bias heating temperature due to differences in the contact are not caused.

What is claimed is:

1. A thermo-magnetic recording method, comprising:
providing a magnetic recording medium having a thermally magnetizable ferromagnetic surface layer disposed on an insulating layer;
contacting a pair of spaced apart electrodes to said ferromagnetic surface layer in a spaced manner said electrodes traversing said ferromagnetic surface layer and defining a predetermined portion of said ferromagnetic surface layer;
applying a voltage to said electrodes causing Joule preheating of said ferromagnetic surface layer; and
inputting a heat pattern in the form of an image and applying uniform magnetic field to form a magnetic latent image in said ferromagnetic surface layer;
wherein said uniform magnetic field is applied by means of a magnetized layer of said magnetic recording medium.

2. A method as claimed in claim 1, wherein said electrodes are sized and disposed such that only a limited area of said ferromagnetic surface layer is heated.

3. A method as claimed in claim 2, wherein said ferromagnetic surface layer includes chromium dioxide.

4. A method as claimed in claim 2, wherein said ferromagnetic surface layer is an thin amorphous alloy layer of a rare earth metal - a transition metal.

5. A method of claimed in claim 1, wherein said heat pattern and said uniform magnetic field are applied immediately after preheating.

6. A method as claimed in claim 1, wherein said heat pattern and said uniform magnetic field are applied simultaneously with said preheating.

7. A method as claimed in claim 6, wherein said ferromagnetic surface layer includes chromium dioxide and an adjustable material for an electric conductivity.

8. A method as claimed in claim 1, including applying said heat pattern by means of a light source.

9. A method as claimed in claim 1, including applying said uniform magnetic field from an external magnet.

10. A method as claimed in claim 1, said heat pattern being applied by means of an array of resistance heating elements disposed between said electrodes.

* * * * *